UNITED STATES PATENT OFFICE.

HENRY W. BURR, OF CAMBRIDGEPORT, MASSACHUSETTS.

CURING RUBBER-COATED FABRICS.

SPECIFICATION forming part of Letters Patent No. 255,139, dated March 21, 1882.

Application filed December 1, 1881. (No model.)

*To all whom it may concern:*

Be it known that I, HENRY W. BURR, a citizen of the United States, residing at Cambridgeport, in the county of Middlesex and State of Massachusetts, have invented certain new and useful Improvements in the Art of Curing Rubber-Coated Fabrics; and I do hereby declare that the same are fully described in the following specification and illustrated in the accompanying drawings.

This improvement relates to the process and the means of curing thin coats of rubber applied to the surface of fabrics, and is designed especially to facilitate the manufacture of that class of water-proof goods termed "gossamers;" but it may be applied to heavier goods.

Heretofore in the manufacture of such rubber-coated fabrics it has been the usual practice to apply a suitable thickness of rubber compound to a continuous web of the body fabric moving through the machine, and, after giving the rubber a coat of paraffine or equivalent substance to prevent its adhesion or injury when rolled up, then to remove the fabric with its uncured coating of rubber from the machine to suitable frames in the open air and expose the same to be cured by the action of sunlight.

It is obvious that this curing process is very largely dependent upon the weather, the time of day, and the season of the year; and that in any event it is very expensive, owing to the space necessarily occupied, the cost of frames and apparatus required, and the extra number of men employed. In addition to this there is great danger of tearing the fabric by such handling, and it is liable to injury by winds, dust, and sudden storms.

My improvement in the art of curing such rubber-coated fabrics consists in subjecting them to the action of the electric light, and preferably so subjecting them during the process of coating and while the fabric is passing through the machine, as will be explained.

My improvement in the means of curing rubber-coated fabrics consists in one or more electric lights suitably arranged and mechanism for moving said fabric through the field of illumination.

It also consists in the devices and combinations of devices set forth in the appended claims.

Figure 1:
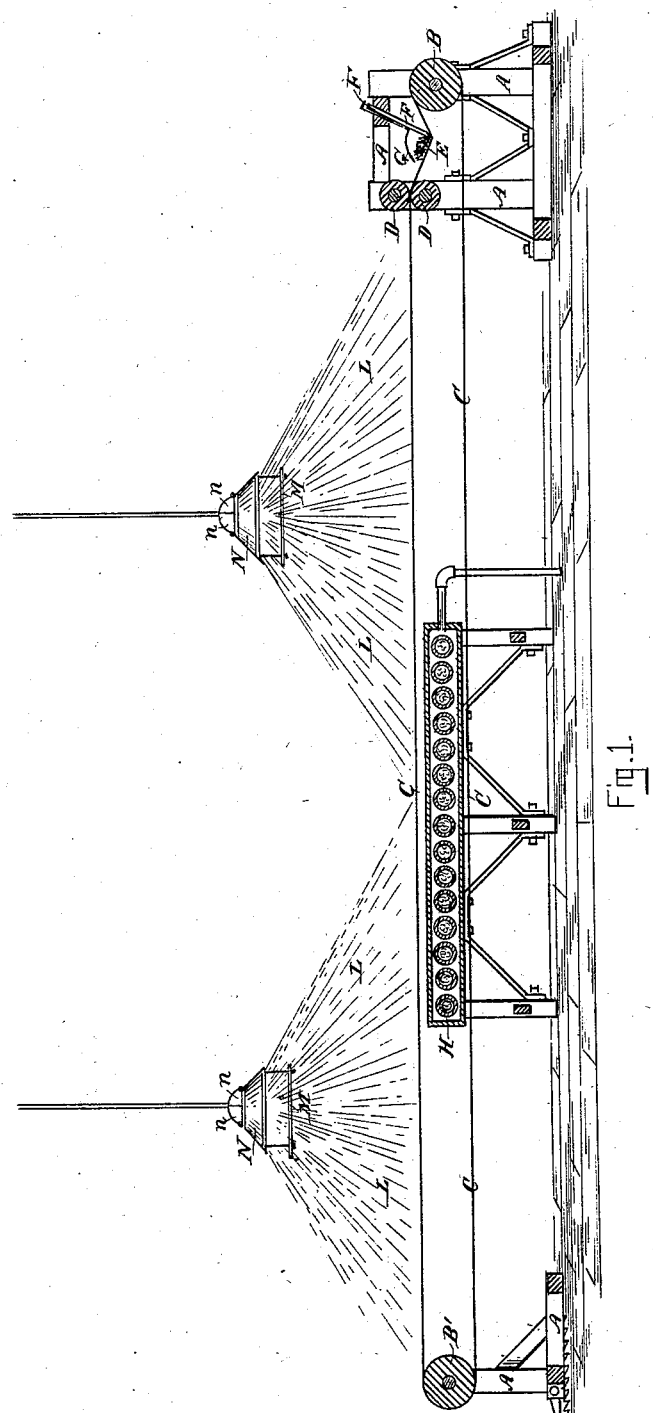
Figure 2:
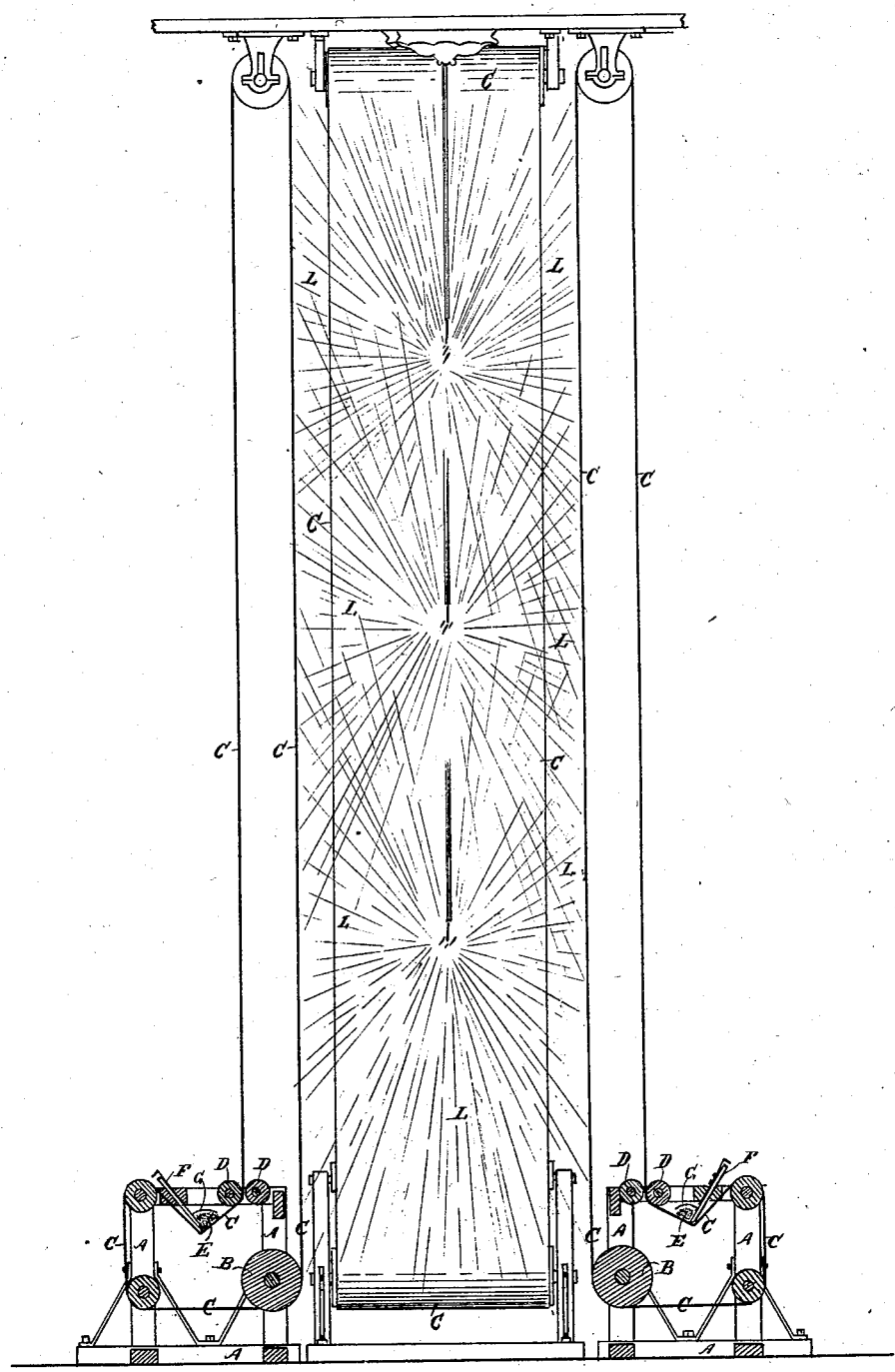

The drawings represent suitable apparatus for practicing my invention, Figure 1 showing a longitudinal section of a coating-machine with a web in position to receive the rays of the electric light, and Fig. 2 a like view of another arrangement of the apparatus.

In the drawings, A is the frame of a suitable machine, supporting near each end a roller, B B', around which passes a web, C, of light fabric, cemented where its ends are joined, so as to be continuous, and carried forward by the rotation of said rollers.

D D' are calender-rollers, between which the web passes, and by which its surface is smoothed and solidified.

E represents a mass of soft or semi-fluid rubber compound, prepared in the ordinary mode, and resting upon the web and kept from moving forward with it bodily by the knife F, which is held in bearings at its ends, so as to bear against the web at a right angle to that portion of it on which the mass E rests. This serves to retain the bulk of the rubber at that point, gives it an irregular rotation, and permits a thin film of it to pass with the web, to which it adheres closely. A guard, G, on the face of the knife, near each end, prevents the rubber from passing laterally off the web C, and when a sufficient thickness has been spread thereon the mass E is removed and the machine operated sufficiently to give a smooth surface at all points.

The bearings of the rollers B or B' may be made movable, so as to set said rollers at such distance from each other as to properly tighten the web. A steam-table, H, is employed between the upper and lower courses of the web, to dry the cloth before coating and assist in evaporating the naphtha or other solvent contained in the softened rubber compound.

Thus far the apparatus is common and suitable for coating fabrics with rubber in the usual way, to be removed for curing in the sunlight.

L L are electric lights, one or more, placed in such relation to the web C in its movement as to cast their rays upon the coating of rubber as it passes or is held exposed thereto. For ordinary establishments the best results will be obtained by applying the rubber in successive coats as the web is driven round in the machine, an additional film being added every time it makes a complete circuit, and the lights L L acting upon some part of it continually, beginning when but a single film has been laid. When the general direction of movement is horizontal, as indicated in Fig. 1, and the light L above the fabric C, I provide a glass shield, M, as a transparent guard against the falling of incandescent particles from the carbons upon the fabric. This shield may be substituted for the metallic one heretofore used immediately at the base of the lower carbon, or it may be larger, thinner, and suspended in a lower plane, as shown in Fig. 1. The necessity of this precaution is obviated by passing the web at one side or one at each side of the lights, instead of directly beneath them.

In order to intensify or concentrate the rays of light, I provide reflectors N, adapted to throw the reflected rays of light upon the rubber surface in addition to the direct rays. I have found the form represented in Fig. 1 to work satisfactorily. The sides $n\ n$ are hinged to the base, and may be turned down to give access to the light when desired.

In some cases it will be desirable to give a principally vertical movement to the fabric, to arrange the lights one above the other, and to utilize said lights to the utmost by running the fabric up and down on four or even six sides of the range of lights, as is indicated in Fig. 2 in elevation.

I do not intend to limit my invention to any particular form of machine or any specific arrangement of the lights or the fabric, except that in some portion of its circuit their rays shall fall upon the rubber surface, or said surface shall pass through or occupy the field of illumination.

The advantages of this improvement in curing the rubber coating are apparent. The work can be carried on day or night in any weather or at any season, and always under cover. No additional workmen are employed, nor any yard-room or drying-frames, nor any additional coat of paraffine or similar material.

I claim as of my invention—

1. The art of curing rubber coatings applied to fabrics by subjecting them to the action of the electric light, substantially as described.

2. The described improvement in the art of curing rubber coatings on fabrics, the same consisting in subjecting said coatings to the action of the electric light while said fabric is in motion through the field of illumination of such light, substantially as set forth.

3. The improvement in the manufacture of rubber-coated fabrics consisting in applying the rubber coating in successive layers while the fabric is moving through the coating-machine, subjecting such coating to the action of the electric light during such movement, and subsequently curing the rubber by means of said light before removal from said machine, substantially as set forth.

4. An apparatus for curing rubber coatings on water-proof fabrics, consisting of one or more electric lights and mechanical means for moving the rubber-coated fabric through the field of illumination, substantially as set forth.

5. The frame, the carrying-rollers B B', adapted to support and move the fabric C, and the calender-roller D D, in combination with the electric lights L L and suitable reflectors, N, for the purpose set forth.

6. The combination of the electric lights L and the glass shield M, for the purpose set forth.

In testimony whereof I hereto affix my signature in presence of two witnesses.

HENRY W. BURR.

Witnesses:
 A. H. SPENCER,
 E. A. PHELPS.